(12) United States Patent
Sasaki

(10) Patent No.: US 6,296,776 B1
(45) Date of Patent: *Oct. 2, 2001

(54) METHOD OF MANUFACTURING A COMBINATION TYPE THIN FILM MAGNETIC HEAD

(75) Inventor: Yoshitaka Sasaki, Yokohama (JP)

(73) Assignee: TDK Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/124,998

(22) Filed: Jul. 30, 1998

(30) Foreign Application Priority Data

Dec. 26, 1997 (JP) .................................................. 9-359426

(51) Int. Cl.⁷ ..................................................... G11B 5/127

(52) U.S. Cl. ............................... 216/22; 216/72; 360/313; 360/126; 29/603.18

(58) Field of Search .................................. 216/22, 51, 67, 216/72, 75, 77; 29/603.14, 603.15; 360/113, 126

(56) References Cited

U.S. PATENT DOCUMENTS

| 4,402,801 | * | 9/1983 | Omata et al. ........................ 204/15 |
| 4,791,719 | * | 12/1988 | Kobayashi et al. ................ 216/51 |
| 4,853,815 | * | 8/1989 | Diepers ............................... 360/126 |
| 4,896,417 | * | 1/1990 | Sawada et al. ..................... 29/603 |
| 4,949,207 | * | 8/1990 | Lazzari ............................... 360/119 |
| 5,138,169 | * | 8/1992 | Yamazaki et al. ................. 250/398 |
| 5,176,792 | * | 1/1993 | Fullowan et al. .................. 156/652 |
| 5,452,164 | * | 9/1995 | Cole et al. .......................... 360/113 |
| 5,566,442 | * | 10/1996 | Gaud et al. ....................... 29/603.14 |
| 5,640,753 | * | 6/1997 | Schultaz et al. ................... 29/603.08 |
| 5,699,605 | * | 12/1997 | Amin et al. ...................... 29/603.14 |
| 5,700,381 | * | 12/1997 | Kimura et al. ..................... 216/22 |
| 5,820,770 | * | 10/1998 | Cohen et al. ....................... 216/22 |
| 5,883,760 | * | 3/1999 | Yamada et al. .................... 360/106 |
| 5,894,389 | * | 4/1999 | Kanamine ......................... 360/126 |
| 5,910,864 | * | 6/1999 | Hira et al. ......................... 360/103 |
| 5,949,625 | * | 9/1999 | Sato et al. ......................... 360/122 |
| 6,027,660 | * | 2/2000 | Hsaio et al. ......................... 216/22 |

FOREIGN PATENT DOCUMENTS

| 60-193114 | | 10/1985 | (JP) . |
| 62-220512 | | 9/1987 | (JP) . |
| 01-73087 A | * | 3/1989 | (JP) .................................. 216/51 |
| 01-96814 A | * | 4/1989 | (JP) . |
| 1-211311 | | 8/1989 | (JP) . |
| 03-108113 A | * | 5/1991 | (JP) . |
| 04-192105 A | * | 7/1992 | (JP) . |
| 8-7225 | | 1/1996 | (JP) . |

OTHER PUBLICATIONS

79044631, "Reactive Ion Etching of Ceramics" IBM Tech. Discl. Bull., vol. 21, No. 11, p. 4631, Apr. 1979.*

* cited by examiner

Primary Examiner—Alexander Markoff
Assistant Examiner—Allan Olsen
(74) Attorney, Agent, or Firm—Oliff & Berridge, PLC

(57) ABSTRACT

On a surface of a substrate 11 made of AlTiC, there is formed a mask made of metal such as permalloy, copper, nickel and nickel boron or compounds of these metals and having an opening at a position corresponding to a recessed portion to be formed, and a reactive ion etching is performed to form a recessed portion 15 while said metal or metal compound layer is used as a mask. In order to form the metal or metal compound layer, a photoresist layer is selectively formed by the photolithography at a position corresponding to the recessed portion to be formed later, and said metal or metal compound layer is deposited by the plating method. By means of the reactive ion etching, it is possible to form the deep recessed portion 15 having a depth not less than 5 μm accurately and a smoothness of the inner wall of the recessed portion can be improved.

18 Claims, 12 Drawing Sheets

FIG_9
PRIOR ART
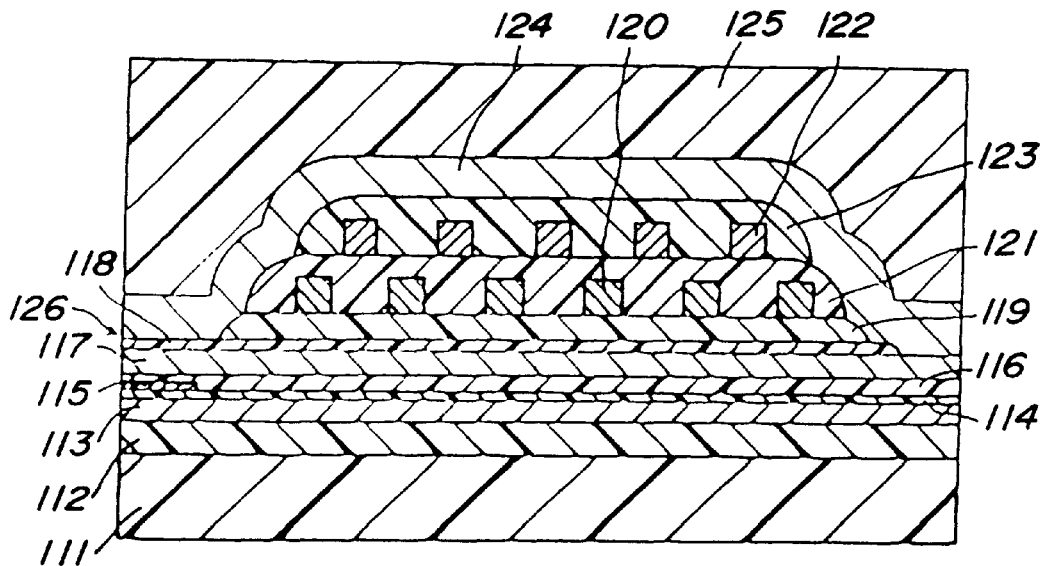
FIG_10
PRIOR ART
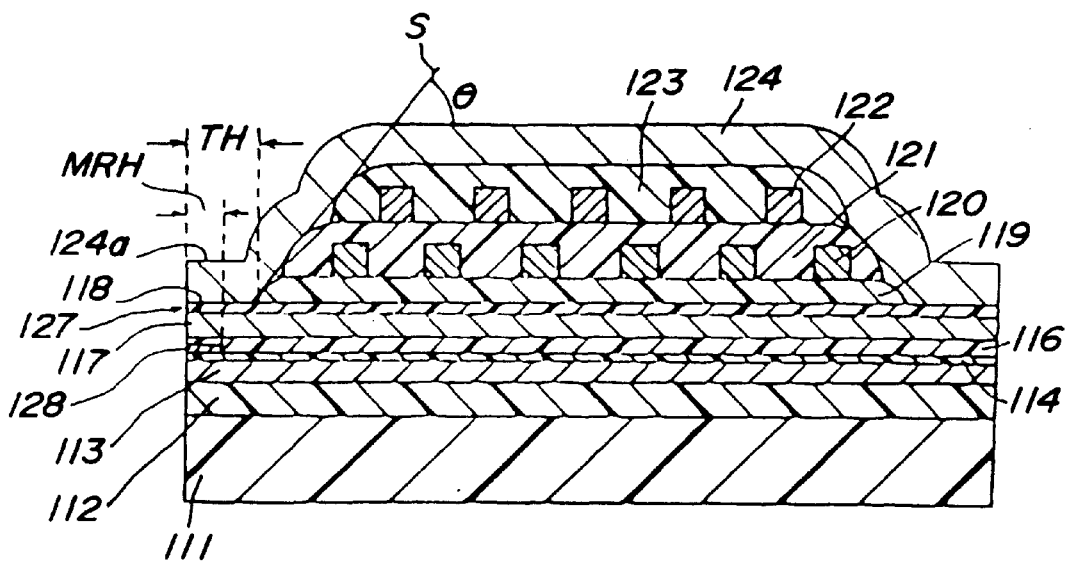

FIG_11
PRIOR ART
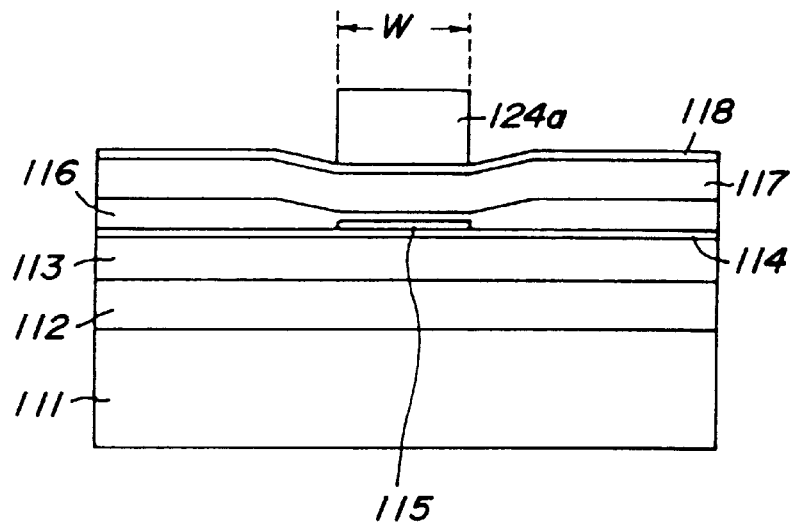
FIG_12
PRIOR ART
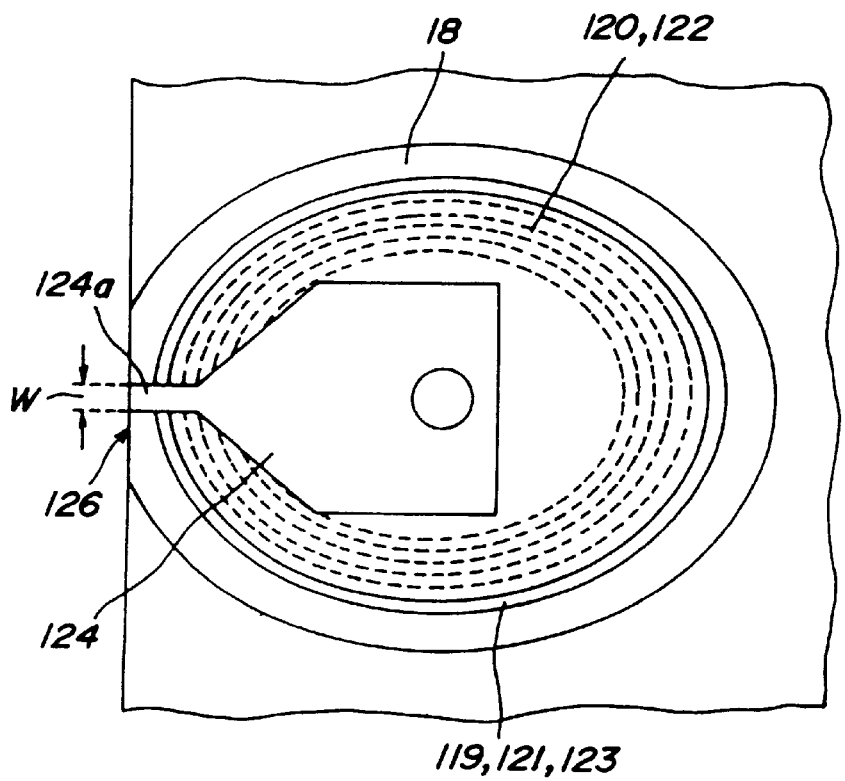

FIG_13
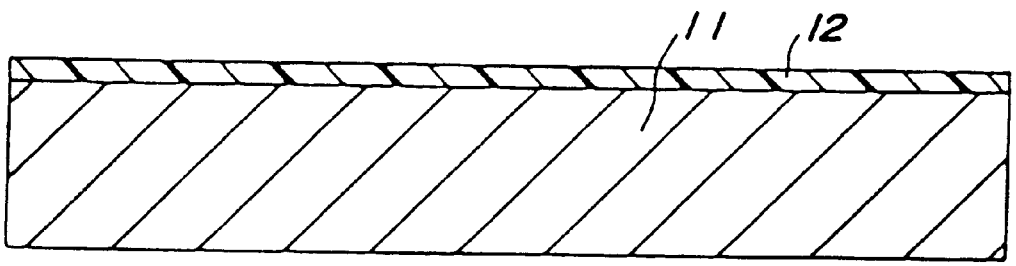
FIG_14
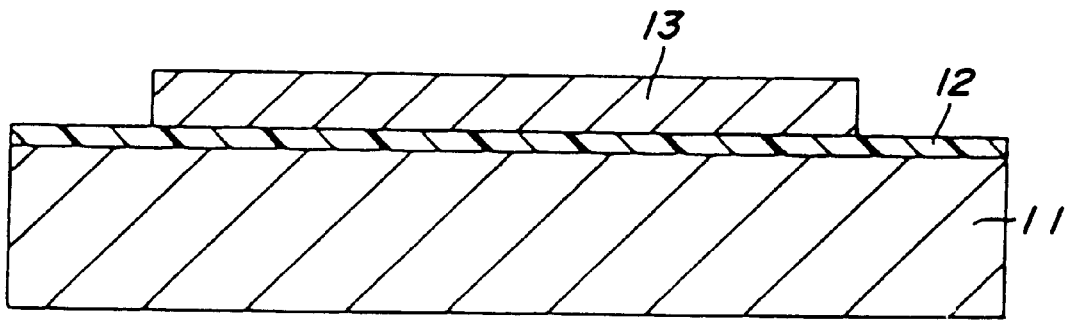
FIG_15
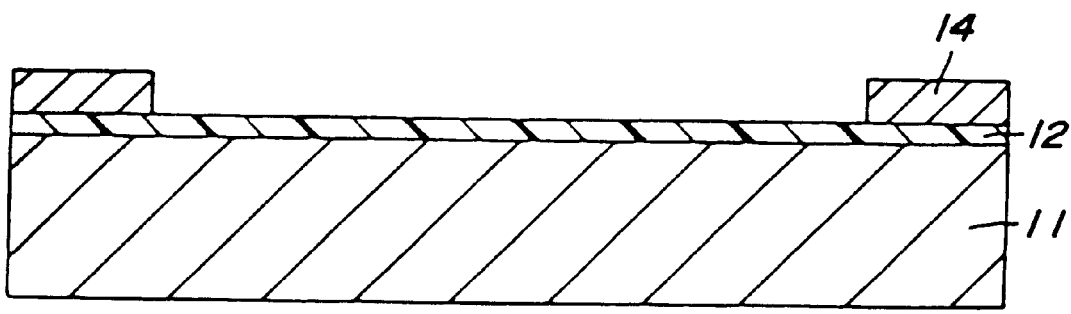

FIG_22
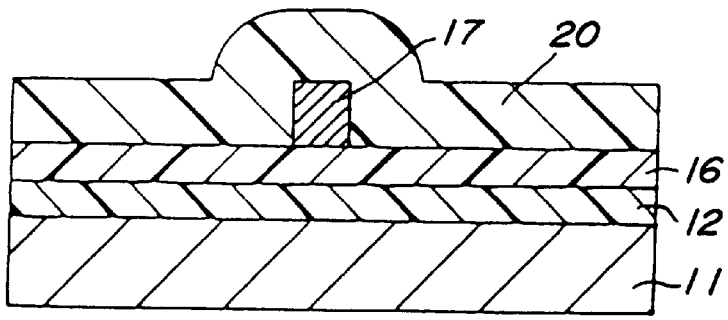
FIG_23
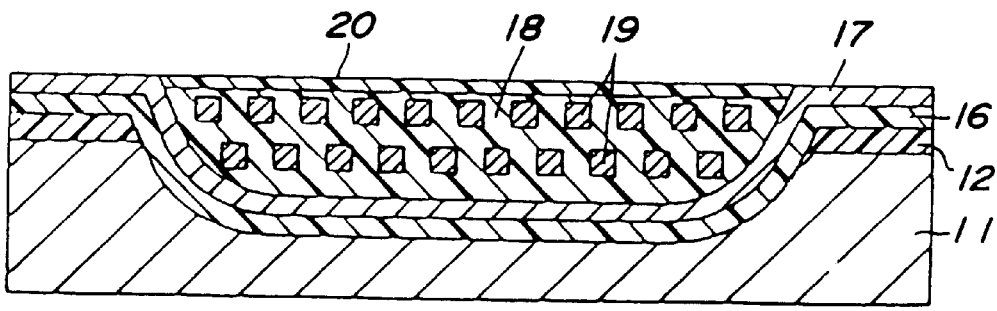
FIG_24
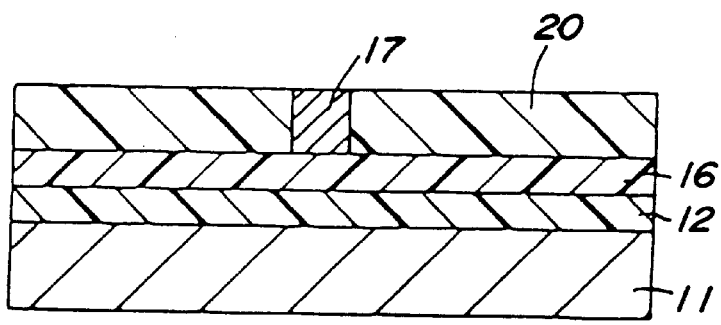

METHOD OF MANUFACTURING A COMBINATION TYPE THIN FILM MAGNETIC HEAD

BACKGROUND OF THE INVENTION

1. Field of the Invention

The present invention relates to a method of manufacturing a thin film magnetic head, and more particularly to a method of manufacturing a combination type thin film magnetic head constructed by stacking an inductive type writing thin film magnetic head and a magnetoresistive type reading thin film magnetic head on a substrate in an electrically insulating and magnetically isolated manner.

2. Description of the Related Art

Recently a surface recording density of a hard disc device has been improved, and it has been required to develop a thin film magnetic head having an improved performance accordingly. In general, as a reading magnetoresistive element, an element utilizing anisotropic magnetoresistive (AMR) effect has been used so far, but there has been further developed a GMR reproducing element utilizing a giant magnetoresistive (GMR) effect having a resistance change ratio higher than that of the normal anisotropic magnetoresistive effect by several times. In the present specification, elements exhibiting a magnetoresistive effect such as AMR and GMR reproducing elements are termed as a magnetoresistive reproducing element or MR reproducing element. By using the AMR reproducing element, a very high surface recording density of several gigabits/inch$^2$ has been realized, and a surface recording density can be further increased by using the GMR element. By increasing a surface recording density in this manner, it is possible to realize a hard disc device which has a very large storage capacity of more than 10 gigabytes. A height (MR Height: MRH) of a magnetoresistive reproducing element is one of factors which determine a performance of a reproducing head including a magnetoresistive reproducing element. The MR height MRH is a distance measured from an air bearing surface on which one edge of the magnetoresistive reproducing element is exposed to the other edge of the element remote from the air bearing surface ABS. During a manufacturing process of the magnetic head, a desired MR height can be obtained by controlling an amount of polishing the ABS.

The performance of the recording magnetic head is also required to be improved in accordance with the improvement of the performance of the reproducing magnetic head. In order to increase a surface recording density, it is necessary to make a track density on a magnetic record medium as high as possible. For this purpose, a width of a write gap at the air bearing surface has to be reduced to a value within a range from several microns to several sub-microns. In order to satisfy such a requirement, the semiconductor manufacturing process has been adopted for manufacturing the thin film magnetic head. One of factors determining the performance of the inductive type thin film writing magnetic head is a throat height TH. This throat height TH is a distance of a pole portion measured from the air bearing surface to an edge of an insulating layer which serves to separate a thin film coil from the air bearing surface. It has been required to shorten this distance as small as possible.

FIGS. 1–12 show successive steps for manufacturing a conventional standard thin film magnetic head and a plan view illustrating a completed thin film magnetic head. It should be noted that the thin film magnetic head is of a combination type in which an inductive type thin film magnetic head for writing and a reproducing thin film magnetic head including a MR element are stacked on a substrate.

First of all, as shown in FIG. 1, an insulating layer 112 consisting of alumina is deposited on a substance 111 made of, for instance AlTiC and having a thickness of about 5–10 μm. Next, as shown in FIG. 2, after forming a bottom shield magnetic layer 113 which protects the MR reproduction element of the reproducing head from the influence of an external magnetic field, an alumina insulating layer 114 of thickness 100–150 nm is deposited by sputtering as shown in FIG. 3.

As illustrated in FIG. 3, a magnetoresistive layer 115 made of a material having the magnetoresistive effect and constituting the MR reproduction element is formed on the insulating layer with a thickness of several tens nano meters and is then shaped into a given pattern by the highly precise mask alignment. Then, as shown in the FIG. 4, an alumina insulating layer 116 similar to the alumina insulating layer 114 is formed, and a magnetic layer 117 made of a permalloy is formed with a film thickness of 3–4 μm as shown in FIG. 5. This magnetic layer 117 has not only the function of the upper shield layer which magnetically shields the MR reproduction element together with the above described bottom shield layer 113, but also has the function of one of poles of the writing thin film magnetic head. Here, the magnetic layer 117 is called a first magnetic layer by taking into account the latter function.

Then, as shown in FIG. 6, after forming a write gap layer 118 made of a non-magnetic material such as alumina and having a thickness of about 150–300 nm on the first magnetic layer 117, an electrically insulating photoresist layer 119 is formed on the gap layer, and then a first layer thin film coil 120 made of, for instance copper is formed on the photoresist layer.

Continuously, as shown in FIG. 7, after forming an electrically insulating photoresist layer 121 on the thin film coil 120 by the highly precise mask alignment, the photoresist layer is sintered at a temperature of, for example 250° C. In addition, as shown in FIG. 8, a second layer thin film coil 122 is formed on the thus flattened surface of the photoresist layer 121, and after forming a photoresist layer 123 on the second layer thin film coil 122 with the highly precise mask alignment, the photoresist layer is flattened by performing the sintering process at a temperature of, for example 250° C. As described above, the reason why the photoresist layers 119, 121, and 123 are formed by the highly precise mask alignment process, is that the throat height (TH) and MR height (MRH) are defined on the basis of a position of the edges of the photoresist layers on a side of the pole portion.

Next, as shown in FIG. 9, a second magnetic layer 124 made of, for example a permalloy and having a thickness of 3–4 μm is selectively formed on the gap layer 118 and photoresist layers 119, 121 and 123 in accordance with a desired pattern.

This second magnetic layer 1124 is coupled with the first magnetic layer 117 at a rear position remote from the magnetoresistive layer 115 such that the thin film coils 120, 122 pass through a closed magnetic circuit composed of the first and second magnetic layers. The second magnetic layer 124 includes a pole portion which has desired configuration and size defining a track width. Furthermore, an overcoat layer 125 made of alumina is deposited on the exposed surfaces of the second magnetic layer 124 and gap layer 118. In an actual thin film magnetic head, electric conductors and contact pads for performing the electrical connection to the thin film coils 120, 122 and MR reproduction element are formed, but they are not shown in the drawings.

In an actual manufacturing process of the combination type thin film magnetic head, the above mentioned substrate 111 is formed by a wafer, and after forming a number of thin film magnetic head units in the wafer in matrix, the wafer is divided into a plurality of bars in which a plurality of thin film magnetic head units are aligned, a side surface of a bar is polished to obtain simultaneously air bearing surfaces of said plurality of thin film magnetic heads, and finally the bar is divided into respective thin film magnetic head. That is to say, as shown in FIG. 10, a side wall 126 at which the magnetoresistive layer 115 is formed is polished to form the air bearing surface 127 which is to be opposed to a magnetic record medium. During the formation of the air bearing surface 127, the magnetoresistive layer 115 is also polished to obtain a MR reproducing element 128. In this way, the above described throat height TH and the MR height MRH are determined.

The polishing for obtaining the air bearing surface could not be conducted while the throat height TH and MR height MRH are actually monitored. Therefore, in the known technique, an electrically conductive patter (not shown in the drawing) connected to the magnetoresistive layer 115 is connected to a resistance measuring circuit, a change in resistance of the magnetoresistive layer 115 due to the decrease in a height of the magnetoresistive layer by polishing is detected as a change in a current, and an amount of polishing of the magnetoresistive layer 115 is calculated in accordance with said change in the current. That is to say, the desired MR height MRH and throat height TH are obtained by conducting the polishing such that the resistance of the MR reproducing element 128 becomes a given value.

FIGS. 10, 11 and 12 are cross sectional view, front view and plan view showing the known combination type thin film magnetic head manufactured in the manner explained above, while the overcoat layer 125 is dispensed with. In FIG. 10, the alumina insulating layers 114 and 116 are shown as a single insulating layer, and in the plan view of FIG. 12, the thin film coils 120, 122 are shown concentrically for the sake of simplicity. As shown in FIG. 10, an angle θ (apex angle) between a line S connecting side comers of the photoresist layers 119, 121, 123 for isolating the thin film coils 120, 122 and the upper surface of the second magnetic layer 124 is an important factor for determining the performance of the thin film magnetic head together with the above described throat height TH and MR height MRH. Moreover, as shown in the plan view of FIG. 12, the width W of a pole portion 124a of the second magnetic layer 124 is small. Since the width of the track recorded on the magnetic record medium is defined by this width W, it is necessary to narrow this width as small as possible in order to achieve a high surface recording density.

In order to improve the surface recording density of the magnetic record medium, it has been required to improve the performance of the recording head as well as the reading head. In the method of manufacturing the combination type thin film magnetic head, the control of sub-micron order using the semiconductor manufacturing technique is indispensable. A manufacturing yield of the combination type thin film magnetic head is largely dependent upon the throat height TH and apex angle θ of the writing inductive type thin film magnetic head and the MR height MRH of the reading magnetoresistive type thin film magnetic head.

As has been explained above with reference to FIGS. 1–12, in the known method of manufacturing the thin film magnetic head, the air bearing surface is polished while the resistance of the magnetoresistive layer 115 of the MR element is measured. However, even if the resistance becomes a given value, the throat height TH and apex angle θ of the writing thin film magnetic head could not be always become desired values. That is to say, during the formation of the writing thin film magnetic head, the positional reference of throat height zero position is defined by the edge of the photoresist layer 119 and the apex angle is defined by a side profile of the photoresist layers 119, 121, 123, but these photoresist layers might be deformed by the heating treatment at about 250° C. during the formation of the thin film coils 120, 122, and thus the positional reference of the throat height zero position and the side profile are changed. Particularly, when the photoresist layers 119, 121, 123 have a large thickness, a deviation of its pattern becomes very large such as about 0.5 μm, and therefore it is no more impossible to realize the fine throat height of the order of several microns to sub-microns in a reliable manner and the desired apex angle could not be attained. Furthermore, in case of using the thick photoresist layers, the pattern might be deviated also due to an unevenness in thickness.

For instance, in the thin film magnetic head for high frequency, the throat height is required to be not larger than 1.0 μm, but due to the above mentioned large error up to 0.5 μm, the throat height might deviate from a desired value during the process of polishing the air bearing surface, and thus a manufacturing cost might be increased. Moreover, since the apex angle has a very small tolerance, the apex angle is liable to be out of the tolerance.

In order to mitigate the above mentioned problem, it has been proposed to form a depressed or recessed portion in the surface of the substrate defining the positional reference of throat height zero. By forming such a recessed portion, an edge of the recessed portion can be utilized as the throat height zero position, and since the position of the edge does not shift during the manufacturing process, the above problem can be solved.

In Japanese Patent Laid-open Publication Kokai Sho 60-193114, there is described a method of forming a recessed portion in a surface of a substrate, i.e. wafer by means of a blade.

In Japanese Patent Publication 62-220512, there is described another method of forming the recessed portion, in which a mask is formed by patterning a photoresist layer, and a wet etching is carried out by using a mixture of $HF+HNO_3$.

Furthermore, in Japanese Patent Laid-open Publication Kokai Hei 8-7225, there is described a method of forming the recessed portion, in which after forming a layer made of ceramics such as aluminum oxide and silicon oxide on a wafer surface, a mask is formed on this layer by patterning a photoresist layer, and the recessed portion is formed by a wet etching using a solution of calcium hydroxide.

Moreover, In Japanese Patent Laid-open Publication Kokai Hei 1-211311, there is described still another method of forming the recessed portion, in which after forming the photoresist mask like as the above mentioned Japanese Patent Laid-open Publication Kokai Hei 8-7225, the recessed portion is formed by an ion beam etching.

However, in the above mentioned mechanical method using the blade, it is difficult to form the recessed portion having desired depth and configuration with a precision of several microns. Moreover, a smoothness of a cut surface is extremely poor.

Moreover, in the method of forming the recessed portion by the wet etching, it is difficult to conduct the anisotropic etching, and thus a side etching might be produced within the recessed portion. Therefore, also in this method, it is difficult to obtain the recessed portion having the smooth inner wall and uniform inclination angle.

Further, in the dry etching such as the ion beam etching, an etching rate is very small, and therefore it is practically difficult to form the recessed portion having a depth not smaller than 5 µm. Furthermore, debris of etched substances might be adhered to the substrate and the pattern of the recessed portion might be deviated from a desired shape. The etching speed is very low.

SUMMARY OF THE INVENTION

It is an object of the present invention to provide a method of manufacturing a thin film magnetic head, in which a recessed portion can be formed accurately, said recessed portion defining the positional reference for the throat height TH, apex angle θ and MR height MRH.

It is another object of the invention to provide a method of manufacturing a combination type thin film magnetic head, in which not only the above object can be attained, but also a GMR layer having a high sensitivity, which is not liable to be degraded by heating, can be provided in a reading thin film magnetic head.

According to the invention, a method of manufacturing a thin film magnetic in which at least a part of a thin film coil is provided within a recessed portion formed in a surface of a substrate comprises:

the step of forming selectively a mask having an opening defining the recessed portion on said substrate;

the step of forming the recessed portion by etching the substrate with a reactive ion etching; and the step of forming said writing thin film magnetic head such that a part of the writing thin film magnetic head is provided with said recessed portion.

Upon practicing the method of manufacturing a thin film magnetic head according to the invention, said mask is preferably made of a metal or metal compound.

In a preferable embodiment of the method of manufacturing a thin film magnetic head according to the invention, said step of forming the recessed portion in the surface of the substrate comprises:

the step of forming a photoresist layer selectively on a part of the surface of the substrate at which the recessed portion is to be formed;

the step of forming a metal or metal compound layer constituting a mask by a plating, while said photoresist layer is used as a mask;

the step of removing said photoresist layer to form said metal or metal compound layer having an opening corresponding to the recessed portion to be formed; and the step of forming the recessed portion in the surface of the substrate by the reactive ion etching through the opening.

The above mentioned mask made of metal or metal compound may be made any kind of metals or metal compounds which can be deposited by the plating method. However, it is preferable that the mask is made of a metal selected from the group consisting of permalloy, copper, nickel and nickel boron or a compound of any one of these metals.

In the method of manufacturing a thin film magnetic head according to the invention, the mask made of metal or metal compound may remained after the formation of the recessed portion or may be removed. In case of removing the mask, before forming the mask made of metal or metal compound, an insulating layer may be formed on the substrate. Then, after forming the recessed portion by the etching, said mask made of metal or metal compound may be removed by etching while said insulating layer is used as an etching stopper.

In the method of manufacturing a thin film magnetic head according to the invention, the reactive ion etching can form the deep recessed portion having a depth not less than 5 µm in an accurate manner. In this case, an inclination angle of a side wall of the recessed portion may be preferably set to 45–75°, particularly 55–65°.

In another preferable embodiment of the method of manufacturing a thin film magnetic head according to the present invention, it is possible to manufacture a combination type thin film magnetic head, in which a writing thin film magnetic head and a magnetoresistive type reproducing element for reading are stacked one on the other.

The method of manufacturing such a combination type thin film magnetic head according to the invention comprises:

the step of forming an element isolating insulating layer on the surface of the substrate and an inner surface of the recessed portion;

the step of forming a first magnetic layer on a surface of said element isolating insulating layer in accordance with a given pattern including a pole portion, said first magnetic layer constituting said writing thin film magnetic head;

the step of forming a thin film coil within the recessed portion such that the thin film coil is isolated by a second insulating layer;

the step of forming a write gap layer at least on a surface of said pole portion of the first magnetic layer and on said thin film coil;

the step of forming a second magnetic layer on a surface of said write gap layer in accordance with a given pattern including a pole portion, said second magnetic layer constituting said writing thin film magnetic head as well as a magnetic shield of said reading thin film magnetic head;

the step of forming a magnetoresistive layer on a surface of said second magnetic layer in accordance with a given pattern such that the magnetoresistive layer is embedded within an electrically insulating and non-magnetic shield gap layer;

the step of forming a third magnetic layer at least on said magnetoresistive layer; and the step of forming the air bearing surface by conducting a polishing process using an edge of said recessed portion as a positional reference to construct the writing thin film magnetic head having a desired throat height as well as the reading thin film magnetic head having a desired MR height.

In a preferable embodiment of the method of manufacturing such a combination type thin film magnetic head, after forming the thin film coil such that the thin film coil is completely embedded within the recessed portion, an insulating layer for flattening is formed on the surfaces of the first magnetic layer and thin film coil, at least this insulating layer is polished to form a co-planar surface with the pole portion of the first magnetic layer, and said write gap layer is formed on the thus flattened surface.

BRIEF DESCRIPTION OF THE DRAWINGS

FIGS. 1–10 are cross sectional views showing successive steps of a known method of manufacturing a conventional thin film magnetic head;

FIG. 11 is a front view illustrating the conventional thin film magnetic head;

FIG. 12 is a plan view depicting the conventional thin film magnetic head;

FIGS. 13–21 are cross sectional views illustrating successive steps of the method of manufacturing the combination type thin film magnetic head according to the invention; FIG. 13 depicts a substrate with alumina; FIG. 14 depicts formation of a photoresist layer; FIG. 15 depicts formation of a metal layer; FIG. 16 depicts formation of a recessed portion; FIG. 17 depicts removal of the permalloy layer by etching; FIG. 18 depicts formation of an element isolating insulating layer; FIG. 19 depicts formation of a first magnetic layer, FIG. 20 depicts formation of a multiple layer thin film coil within the recessed portion; FIG. 21 depicts deposition of an alumina insulating layer;

FIG. 22 is a cross sectional view depicting the pole portion;

FIG. 23 is a cross sectional view showing a portion of the surface of the magnetic layer coplanar with the surface of the insulating layer;

FIG. 24 is a cross sectional view illustrating the pole portion in the step of FIG. 21;

DESCRIPTION OF THE PREFERRED EMBODIMENTS

Figure 1:
Figure 2:
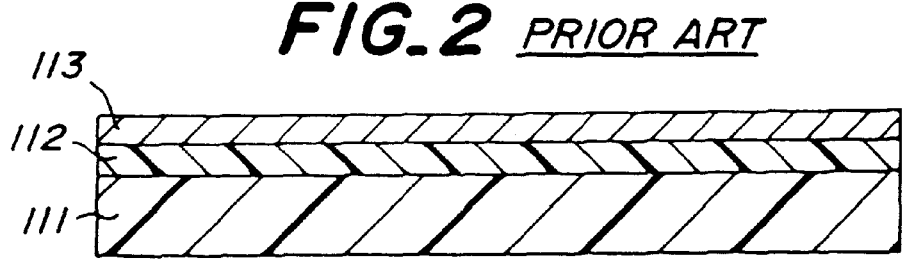
Figure 3:
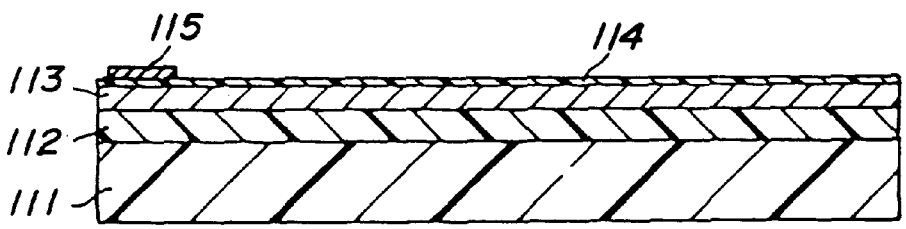
Figure 4:
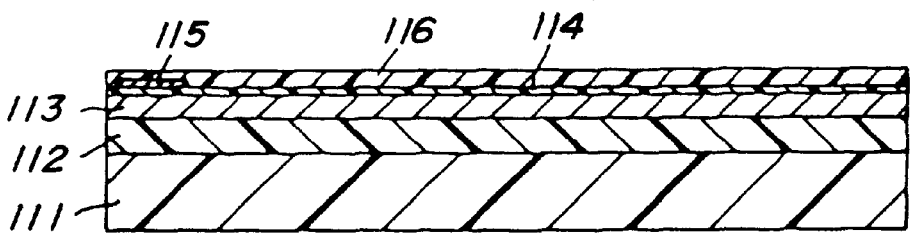
Figure 5:
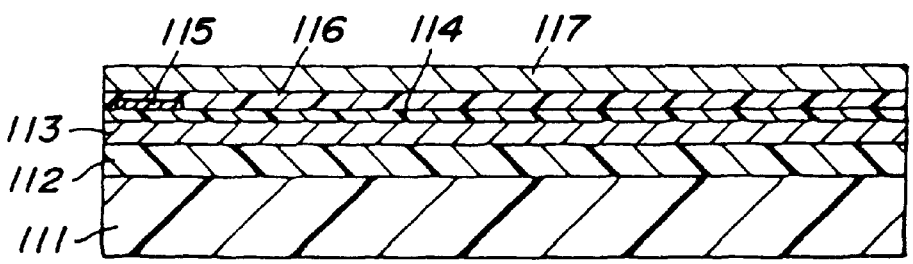
Figure 6:
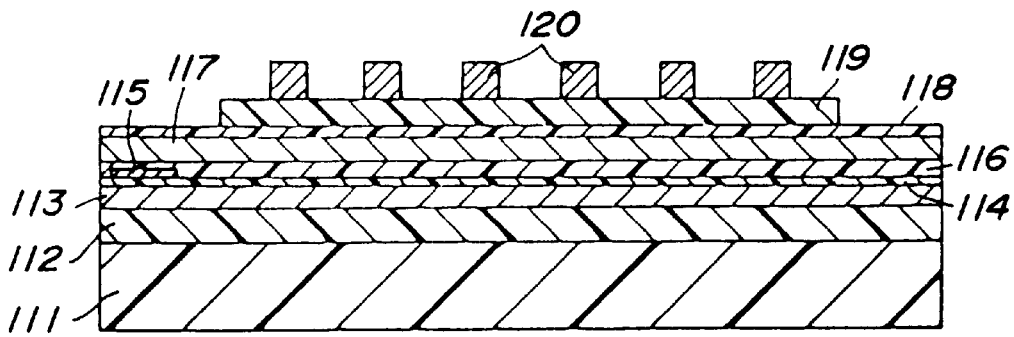
Figure 7:
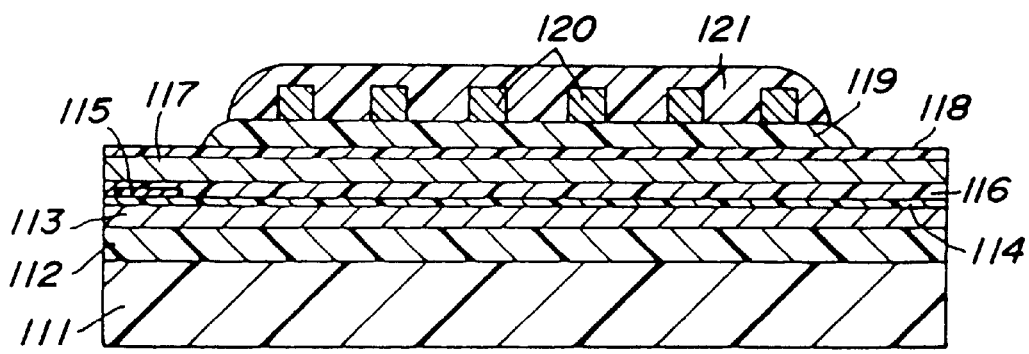
Figure 8:
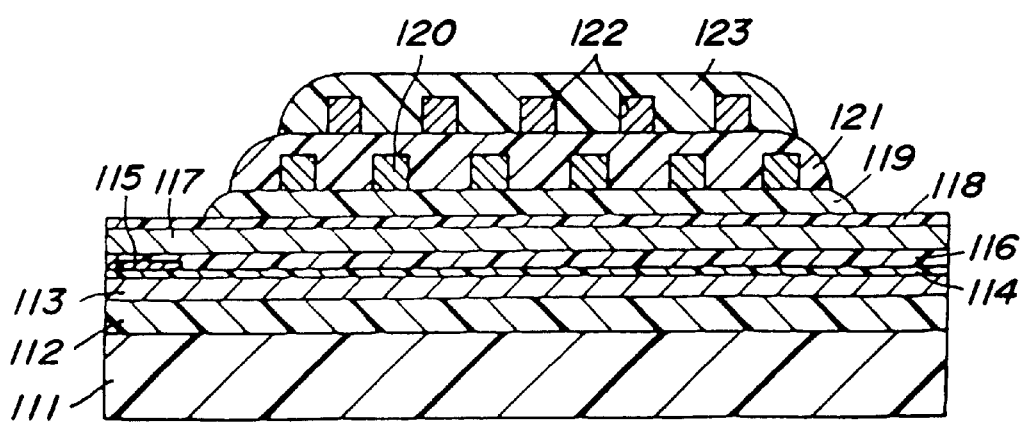

FIGS. 13–33 show successive steps of a first embodiment of the method of manufacturing the combination type thin film magnetic head according to the invention. In these drawings, in order to clarify the feature of the present invention, sizes of respective components are shown in an exaggerating manner. Further, a substrate of a single combination type thin film magnetic head is formed by cutting a wafer, and therefore the substrate and wafer are denoted by the same reference numeral.

At first, as shown in FIG. 13, an insulating layer 12 made of alumina and having a thickness of about 0.34–0.5 μm is formed by sputtering on a whole surface of a substrate 11 made of AlTiC. Next, as shown in FIG. 14, a photoresist layer 13 is selectively formed on the alumina insulating layer 22, said photoresist layer defining a plan configuration of a recessed portion to be formed later. Further, as depicted in FIG. 15, a metal layer 24 made of a metal or metal compound, in the present embodiment a permalloy, is formed by plating while said photoresist layer is used as a mask. Then, the photoresist layer 13 is removed.

The metal or metal compound layer may be made of a permalloy (FeNi), copper (Cu), nickel (Ni) or nickel boron (NiB) or compounds of these metals. As will be understood, the metal or metal compound layer serves as a mask for forming the recessed portion by etching, and thus has preferably a thickness of 3–4 μm such that a sufficiently thick mask layer will remain after the etching.

Figure 16:
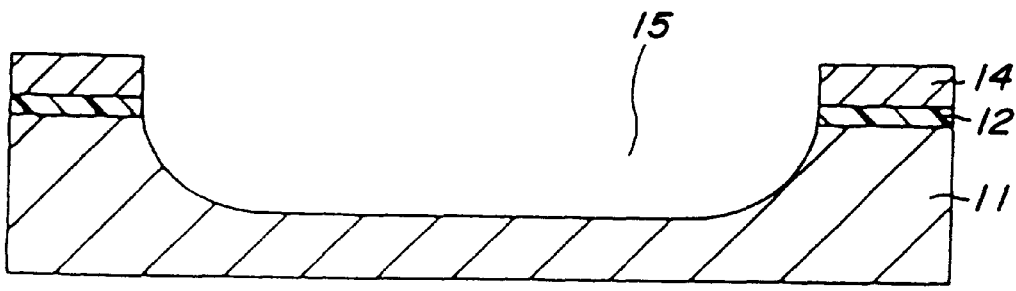

After forming the permalloy layer 14 as stated above, a recessed portion 15 is formed in the surface of the substrate 11 as shown in FIG. 16 by performing a reactive ion etching (RIE) which is one of anisotropic dry etchings. By using the RIE, it is possible to form the recessed portion 15 having a thickness not less than 5 μm with a size precision of 0.1 μm order. Moreover, the recessed portion has a very smooth inner surface.

As a gas used in the RIE for forming the recessed portion 15, a fluorine series gas such as silicon tetrafluoride ($CF_4$) and sulfur hexafluoride ($SF_6$), a chlorine series gas such as boron trichloride ($BCl_3$) and chlorine ($Cl_2$) or one of these gases diluted with oxygen ($O_2$) or inert gas such as nitrogen ($N_2$), argon (Ar) and helium (He).

In the present embodiment, since the apex angle θ is determined by an inclination angle of a side wall of said recessed portion 15 near the air bearing surface, it is preferable to form the recessed portion such that the side wall of the recessed portion has the inclination angle of 45–70°, particularly 55–65° in order to realize a high surface recording density.

Figure 17:
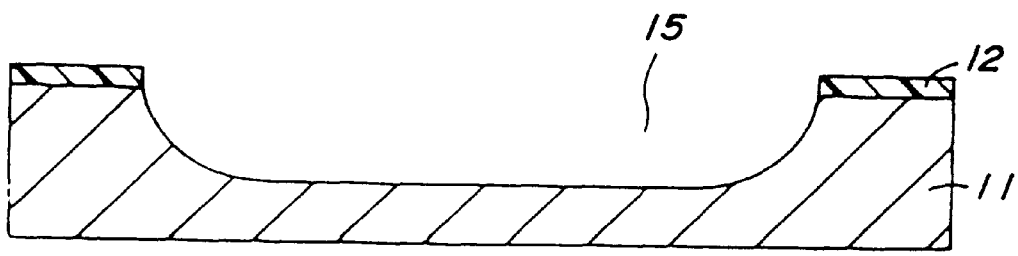

After forming the recessed portion 15 in this manner, the permalloy layer 14 is removed by etching as illustrated in FIG. 17. During the removal of the permalloy layer 14, the insulating layer 12 serves as an etching stopper, but it is not necessary to remove the insulating layer 12, but may be remained.

Figure 18:
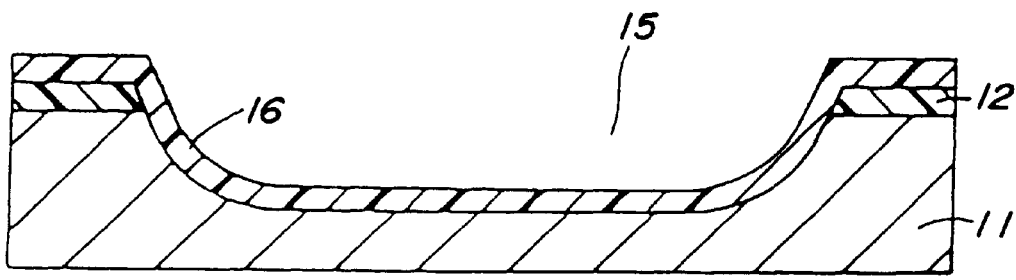

Next, as shown in FIG. 18, an element isolating insulating layer 16 made of alumina is formed by sputtering with a thickness of 0.5–1.0 μm, said insulating layer serving to separate the inductive type thin film writing magnetic head element from the substrate 11.

Figure 19:
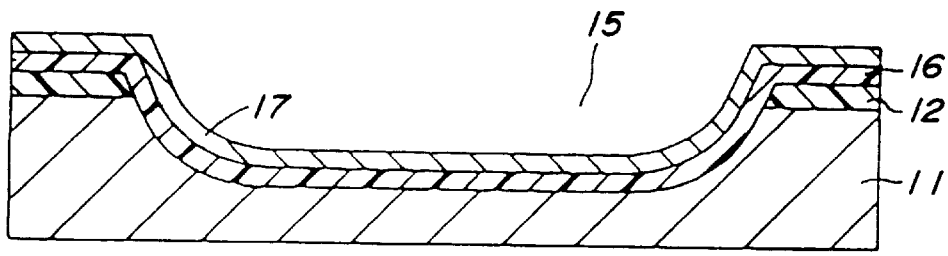

Next, in order to form a bottom pole of the inductive type thin film writing magnetic head, a first magnetic layer 17 is formed in accordance with a predetermined pattern as shown in FIG. 19. In the present embodiment, the first magnetic layer 17 is formed with a thickness of 3–4 μm by the plating method using a photoresist pattern. The first magnetic layer 17 includes a pole portion having a narrow width defining a track width.

Figure 20:
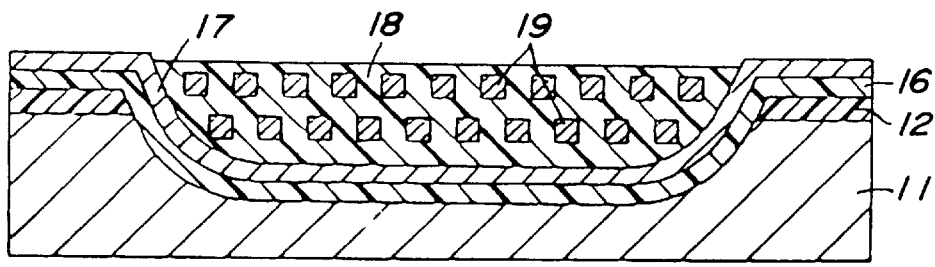

Subsequently as shown in FIG. 20, a multiple layer thin film coil 19 is formed within the recessed portion 15 formed in the surface of the substrate 11 such that the thin film coil is isolated by an insulating layer 18. During the formation of the thin film coil 19, a heating treatment is carried out at about 250° C., but the configuration of the recessed portion 15 is not changed. Therefore, the positional reference of throat height zero and apex angle are not changed by the heating treatment. Moreover, a top surface of the thin film coil 19 formed within the recessed portion 15 descends and thus a depression is formed above the recessed portion.

Figure 21:
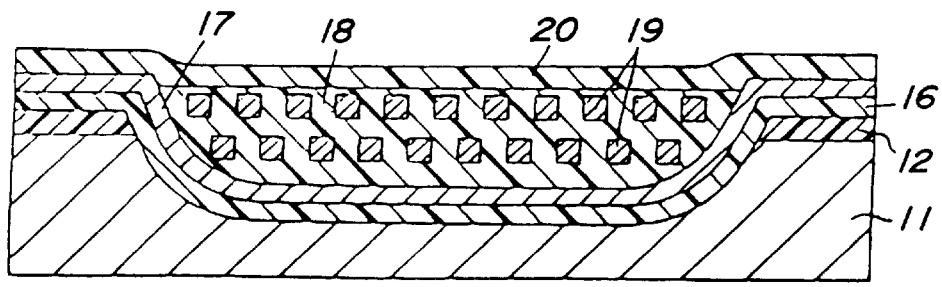

Next, as shown in FIG. 21, an alumina insulating layer 20 having a thickness of 4–5 μm is deposited such that the above mentioned depression is filled with alumina. FIG. 22 is a cross sectional view showing the pole portion of this condition. As illustrated in FIG. 22, the insulating layer 20 is formed to cover the pole portion of the first magnetic layer 17. Further, the insulating layer 20 may be made of silicon oxide and silicon nitride instead of alumina.

Then, a chemical mechanical polishing (CMP) is carried out such that the surface of the first magnetic layer 17 of a portion formed on the substrate except for the recessed portion 15 becomes coplanar with the surface of the insulating layer 20 as illustrated in FIGS. 23 and 24. In this case, the surface of the first magnetic layer 17 is not always to be polished, but in order to make the polishing easy, it is preferable to polish the surface of the first magnetic layer to a little extent.

Figure 25:
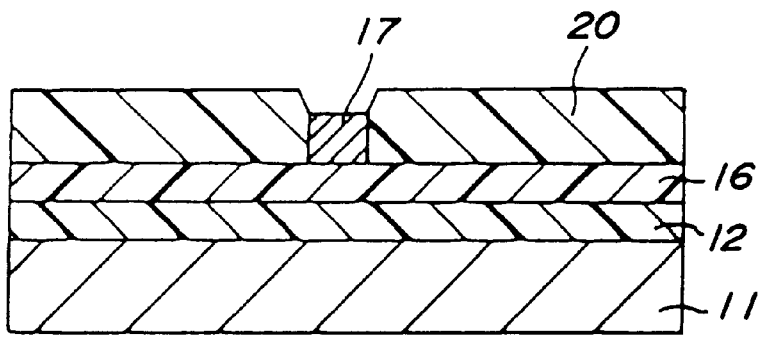
FIG. 25 is a cross sectional view showing an etched back portion of the exposed surface of the first magnetic layer.
Figure 26:
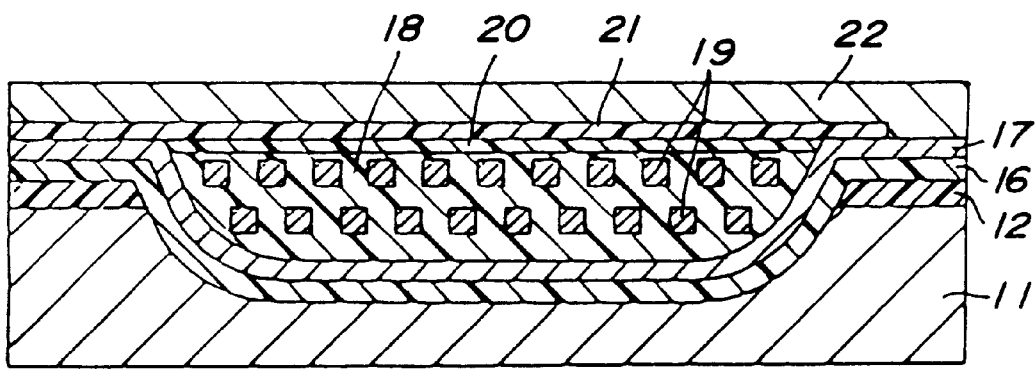
FIG. 26 is a cross sectional view depicting formation of a write sap layer.
Figure 27:
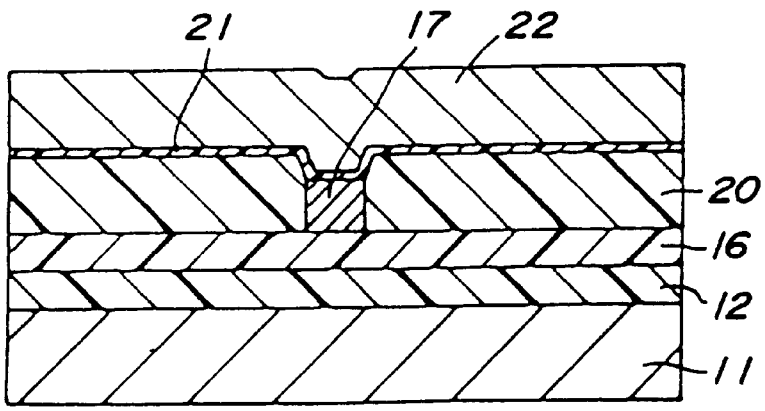
FIG. 27 is a cross sectional view showing the pole potion.

Then, as depicted in FIG. 25, the exposed surface of the first magnetic layer 17 is etched back over a part of its thickness by means of the ion beam etching. Furthermore, as shown in FIGS. 26 and 27, a write gap layer 21 made of alumina and constituting the write gap of the writing thin film magnetic head is formed with a thickness of 150–300 nm, and a second magnetic layer 22 made of permalloy is formed with a thickness of 3–4 μm by means of the plating using a photoresist mask. The second magnetic layer 22 is magnetically coupled with the first magnetic layer 17 at a portion remote from the air bearing surface such that the a part of the thin film coil 19 passes through a closed magnetic circuit formed by the first and second magnetic layers 17 and 22.

In the present embodiment, as stated above, after etching back the pole portion of the first magnetic layer 17, the write gap layer 21 and second magnetic layer 22 are formed. Therefore, the trim structure protruding toward the first magnetic layer 17 is formed in a self-alignment manner under the pole portion of the second magnetic layer 22. In this manner, it is possible to obtain the thin film magnetic head in an easy manner, said magnetic head being capable of reducing the leakage of the magnetic flux, converging the magnetic flux and realizing the high surface recording density.

Figure 28:
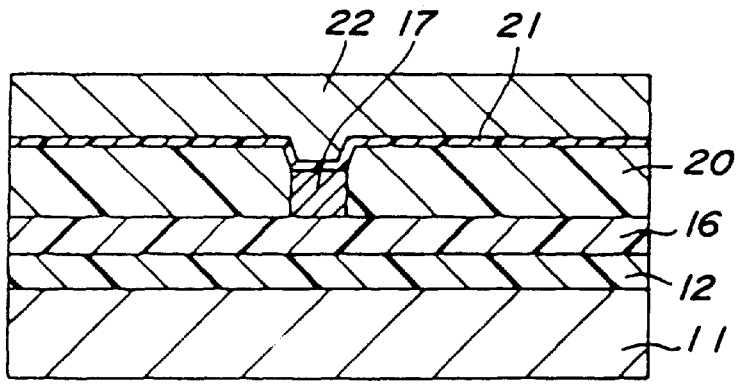
FIG. 28 is a cross sectional view depicting the flattened surface of the second magnetic layer.

Further, the depressed portion formed in the surface of the second magnetic layer 22 for forming the trim structure is flattened by, for instance CMP as shown in FIG. 28.

Figure 29:
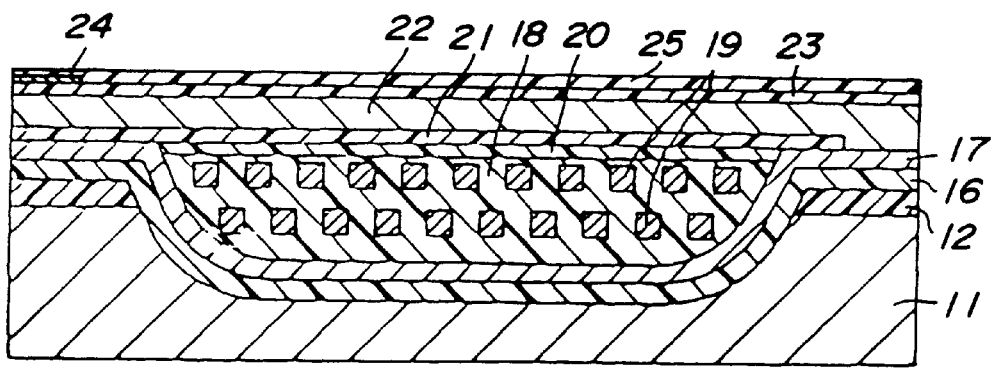
FIG. 29 is a cross sectional view illustrating formation of a MR layer on the shield gap layer.
Figure 30:
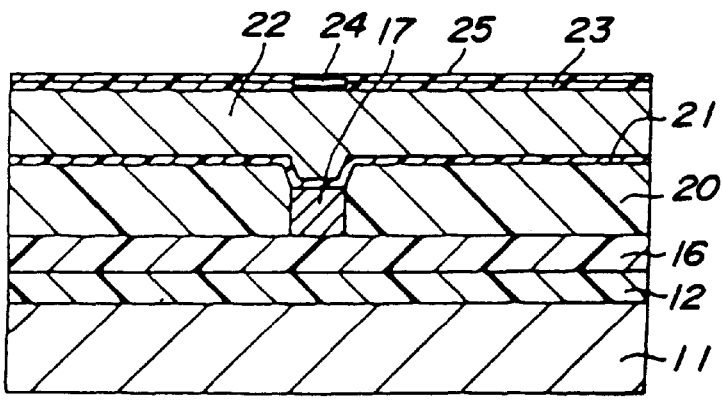
FIG. 30 is a cross sectional view depicting the pole portion.

Next, as illustrated in FIGS. 29 and 30, after forming a shield gap layer 23 made of alumina with a thickness of 100–200 nm, a MR layer 24 is formed on the shield gap layer 23, and further a shield gap layer 25 is formed thereon. The MR layer 24 is formed selectively by means of the photography and etching techniques. The etching has to be controlled precisely, and thus it is preferable to use the dry etching such as RIE.

Figure 31:
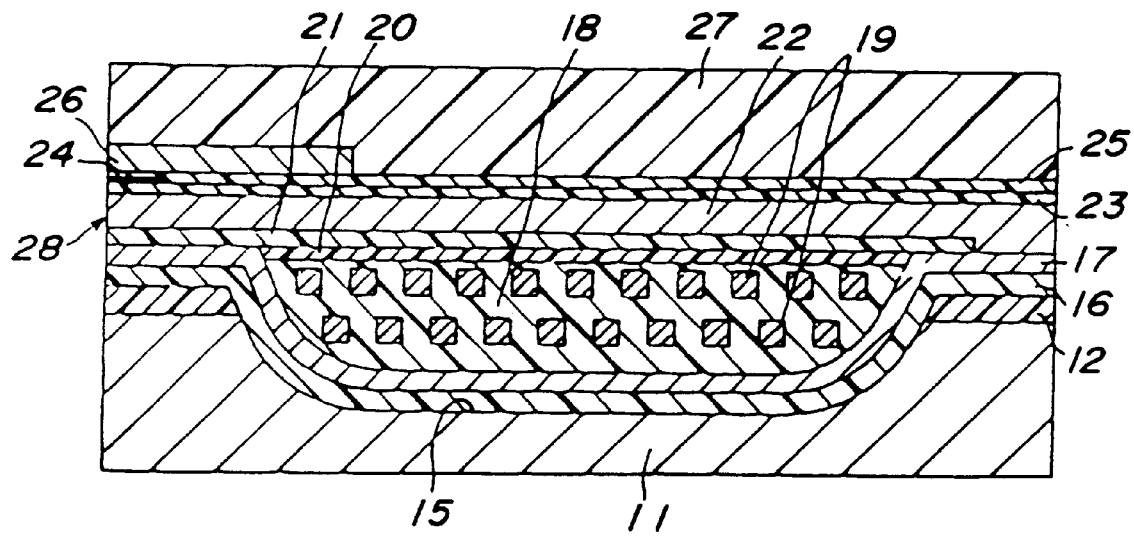
FIG. 31 is a cross sectional view showing formation of a permalloy magnetic layer.
Figure 32:
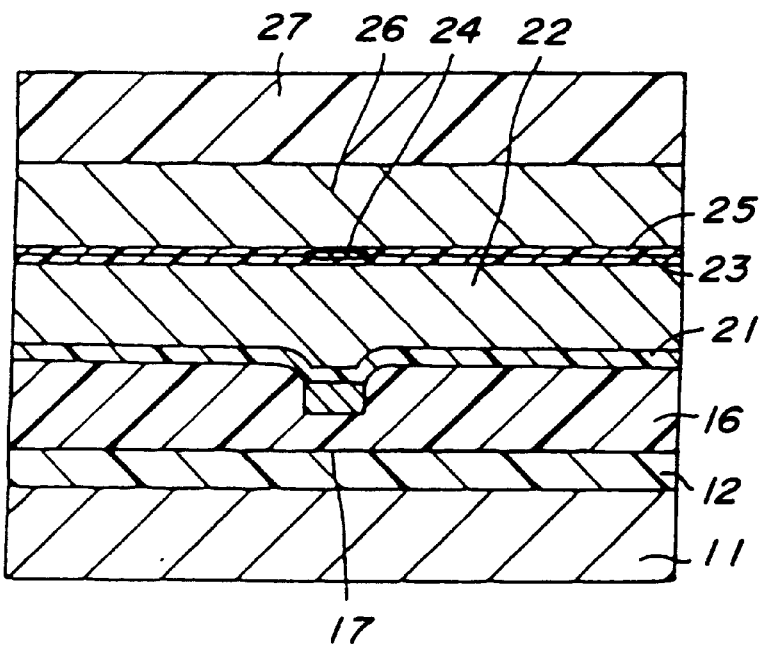
FIG. 32 is a cross sectional view depicting the pole portion.

As shown in FIGS. 31 and 32, on the shield gap layer 25 is formed a third magnetic layer 26 made of permalloy in order to protect the MR reproducing element from the external magnetic field. Then, an overcoat layer 27 made of alumina is formed in order to protect the whole thin film magnetic head from mechanical damage.

Figure 33:
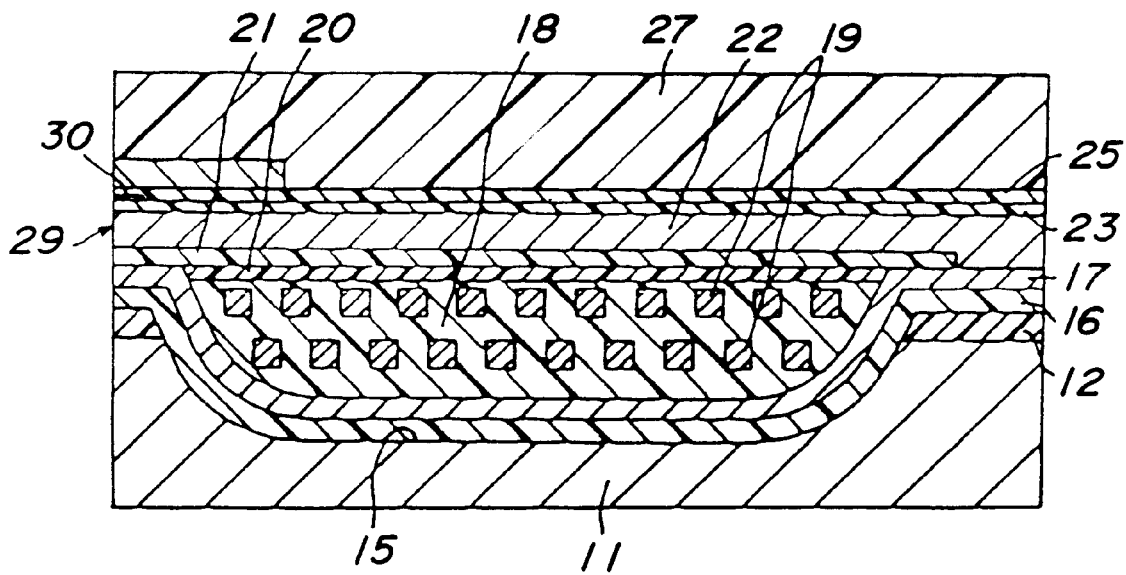
FIG. 33 is a cross sectional view showing the attainment of the desired throat height and MR height.

Finally, in order to obtain desired throat height and MR height, a side edge 28 of the substrate 11 is polished to form an air bearing surface 29 as well as a MR element 30 having the desired throat height as shown in FIG. 33.

According to the present invention, the edge of the recessed portion 15 formed in the substrate is utilized as the positional reference of throat height zero and the position of this edge is not shifted during the manufacturing process, and therefore the throat height and MR height can be formed to have desired values.

The present invention is not limited to the above embodiment and many alternations and modifications may be conceived within the scope of the invention. For example, in the above embodiment, the MR reproducing element is constructed by the AMR element, but according to the invention, the MR reproducing element may be formed by the GMR element using spin bulb layer, super-lattice GMR layer and granular GMR layer. These GMR elements have a drawback that the reproduced output is deceased to a large extent by the high temperature annealing at about 250C. for forming the thin film coil of the thin film magnetic head. For instance, in the spin bulb film having Ni—Fe magnetic and Cu non-magnetic layers, a multi-layer structure of the spin bulb film might be destroyed by heating at a temperature not lower than 250° C. due to a mixing of Ni and Cu. In the above mentioned first and second embodiments according to the invention, the formation of the thin film coil within the recessed portion has been completed before forming the GMR film, and thus the GMR film is not affected any more.

Moreover, in the above mentioned first embodiment, the trim structure is formed in the first magnetic layer 27 by conducting the etching process using the pole chip 32 formed by the second magnetic layer as a mask, but such a trim structure is not always necessary.

Moreover, in the above embodiments, the thin film magnetic head is constructed as the combination type thin film magnetic head in which the recording thin film magnetic head and MR reproducing element are stacked, but according to the invention it is not always necessary to provide the MR reproducing element and only the inductive type thin film magnetic head may be formed.

As explained above, according to the thin film magnetic head, the first insulating layer and thin film coil are formed within the recessed portion formed in the surface of the substrate, the second magnetic layer constituting the pole chip is formed via the gap layer, and the third magnetic layer is formed to be contacted with the second magnetic layer. Therefore, the throat height TH and apex angle θ can be formed accurately to have desired design values and the performance of the thin film magnetic head can be improved. Furthermore, in the combination type thin film magnetic head having the reproducing head constructed by the magnetoresistive element, the formation of the thin film coil has been finished prior to the formation of the magnetoresistive element, and thus the magnetoresistive element is not affected by the heating treatment for forming the thin film coil, and the GMR element having a high sensitivity can be utilized, said GMR element being affected by the heating treatment.

According to the invention, when the trim structure is formed by etching the first magnetic layer using the pole chip constructed by the second magnetic layer as a mask, the magnetic flux is not expanded during the writing and thus the effective track width is not expanded. Therefore, the track width of sub-microns can be realized and the surface recording density can be materially improved. Further, the trim structure is formed by using the pole chip as a mask, the trim structure can be formed accurately by the self-alignment.

Furthermore, the second magnetic layer is extended inwardly beyond the pole portion, and thus a sufficiently large contact area can be attained between the second magnetic layer and the third magnetic layer, and the writing magnetic flux is not saturated at a point before the pole portion.

In the method of manufacturing the combination type thin film magnetic head according to the invention, by controlling a thickness of the insulating layer formed on the inner surface of the recessed portion formed in the substrate, the throat height zero reference position for the throat height of the inductive type thin film writing magnetic head can be controlled. In this case, the MR height of the MR reproducing element is not influenced at all, and therefore the throat height can be formed to have a desired design value without destroying the balanced condition between the throat height and the MR height.

Moreover, the control of a thickness of the insulating layer can be performed very easily without changing largely the manufacturing process, and therefore various requirements of users can be satisfied in an easy and prompt manner.

Furthermore, the apex angle of the inductive type thin film writing magnetic head is determined by the inclination angle of the side wall of the recessed portion and this inclination angle is not changed during the manufacturing process. Therefore, it is possible to manufacture the combination type thin film magnetic head having the apex angle corresponding to the desired design value.

What is claimed is:

1. A method of manufacturing a thin film magnetic head in which at least part of a thin film coil is provided within a recessed portion formed in a surface of a substrate comprising:

a step of forming an insulating layer on said substrate;
   a step of forming selectively a mask having an opening defining the recessed portion on said insulating layer;
   a step of forming the recessed portion by etching the insulating layer and substrate with a reactive ion etching;
   a step of forming an element isolating insulating layer on an inner surface of the recessed portion as well as on a surface of said insulating layer surrounding the recessed portion; and
   a step of forming a writing thin film magnetic head on said element isolating insulating layer such that a part of the writing thin film magnetic head is provided within said recessed portion.

2. A method of manufacturing a thin film magnetic head according to claim 1, wherein said substrate is made of AlTiC and said insulating layer and element isolating insulating layer are made of alumina.

3. A method of manufacturing a thin film magnetic head according to claim 2, wherein said mask is made of a metal or metal compound.

4. A method of manufacturing a thin film magnetic head according to claim 3, wherein said mask is made of a material selected from the group consisting of permalloy, copper, nickel, nickel boron and compounds of these metals.

5. A method of manufacturing a thin film magnetic head according to claim 3, wherein said step of forming the recessed portion in the surface of the substrate comprises:

a step of forming a photoresist layer selectively on a part of the surface of the insulating layer at which the recessed portion is to be formed;
   a step of forming a metal or metal compound layer constituting a mask by plating, while said photoresist is used as a mask;
   a step of removing said photoresist layer to form said metal or metal compound layer having an opening corresponding to the recessed portion to be formed;
   a step of forming the recessed portion in the surface of the substrate through said insulating layer by the reactive ion etching through the opening; and
   a step of removing said metal or metal compound layer by etching while said insulating layer is used as an etching stopper.

6. A method of manufacturing a thin film magnetic head according to claim 5, wherein said reactive ion etching is performed using a fluorine series gas as a reactive gas.

7. A method of manufacturing a thin film magnetic head according to claim 6, wherein said fluorine series gas is selected from the group consisting of $CF_4$, $SF_6$ and said gases diluted with oxygen or inert gas.

8. A method of manufacturing a thin film magnetic head according to claim 5, wherein said reactive ion etching is performed using a chlorine series gas as a reactive gas.

9. A method of manufacturing a thin film magnetic head according to claim 8, wherein said chlorine series gas is selected from the group consisting of $BCl_3$, $Cl_2$ and said gases diluted with oxygen or inert gas.

10. A method of manufacturing a thin film magnetic head according to claim 5, wherein said recessed portion is formed to have a depth not less than 5 $\mu$m.

11. A method of manufacturing a thin film magnetic head according to claim 5, wherein said recessed portion is formed such that an inclination angle of a side wall of the recessed portion is set to 45–75°.

12. A method of manufacturing a thin film magnetic head according to claim 11, wherein said recessed portion is formed such that an inclination angle of a side wall of the recessed portion is set to 55–65°.

13. A method of manufacturing a thin film magnetic head according to claim 1, wherein said method includes a step of forming a reading magnetoresistive type thin film magnetic head in addition to the step of forming the writing thin film magnetic head.

14. A method of manufacturing a thin film magnetic head according to claim 9, wherein said step of forming the writing thin film magnetic head comprises forming a combination head, including a reading magnetoresistive thin film magnetic head, comprising:

a step of forming a first magnetic layer on a surface of said element isolating insulating layer in accordance with a given pattern including a pole portion, said first magnetic layer constituting said writing thin film magnetic head;
   a step of forming a thin film coil within the recessed portion such that the thin film coil is isolated by a second insulating layer;
   a step of forming a write gap layer at least on a surface of said pole portion of the first magnetic layer and on said thin film coil;
   a step of forming a second magnetic layer on a surface of said write gap layer in accordance with a given pattern including a pole portion, said second magnetic layer constituting said writing thin film magnetic head as well as a magnetic shield of said reading magnetoresistive thin film magnetic head;
   a step of forming a magnetoresistive layer on a surface of said second magnetic layer in accordance with a given pattern such that the magnetoresistive layer is embedded within an electrically insulating and non-magnetic shield layer;
   a step of forming a third magnetic layer on said electrically insulating and non-magnetic shield layer on said magnetoresistive layer; and
   a step of forming the air bearing surface by conducting a polishing process using an edge of said recessed portion as a positional reference to construct the writing thin film magnetic head having a desired throat height as well as the reading magnetoresistive thin film magnetic head having a desired MR height.

15. A method of manufacturing a thin film magnetic head according to claim 14, wherein after forming the thin film coil such that the thin film coil is completely embedded within the recessed portion, a third insulating layer for flattening is formed on the surface of the first magnetic layer and thin film coil, at least said third insulating layer is polished to form a co-planar surface with the pole portion of the first magnetic layer.

16. A method of manufacturing a thin film magnetic head according to claim 15, wherein after forming said co-planar surface, a surface portion of the pole portion of the first magnetic layer is removed using said third insulating layer as a mask to form a depressed portion above the pole portion, and after forming said write gap on the first magnetic layer as well as on the third insulating layer, said second magnetic layer is formed on the write gap layer such that said depressed portion is completely filled with the pole portion of the second magnetic layer to constitute a trim structure.

17. A method of manufacturing a thin film magnetic head according to claim 16, wherein said surface portion of the pole portion of the first magnetic layer is removed by an ion beam etching.

18. A method of manufacturing a thin film magnetic head according to claim 17, wherein after forming said second magnetic layer, a surface of the second magnetic layer is flattened by a chemical mechanical polishing.

* * * * *